United States Patent [19]

Robbins et al.

[11] Patent Number: 4,755,356

[45] Date of Patent: Jul. 5, 1988

[54] LOCKING MICROCENTRIFUGE TUBE

[75] Inventors: Paul B. Robbins, Palo Alto; Arthur J. Robbins, Mountain View; Thomas R. Sutton, San Jose, all of Calif.

[73] Assignee: Robbins Scientific Corporation, Mountain View, Calif.

[21] Appl. No.: 821,828

[22] Filed: Jan. 23, 1986

[51] Int. Cl.[4] ........................ G01N 21/03; B65D 55/16

[52] U.S. Cl. ........................................ 422/102; 422/58; 215/306; 220/375; 436/165

[58] Field of Search ..................... 422/102, 72; 436/58, 436/165; 215/306; 220/375, 82 R

[56] References Cited

U.S. PATENT DOCUMENTS

| | | | |
|---|---|---|---|
| Re. 30,625 | 5/1981 | Akers | 215/211 |
| 3,848,780 | 11/1974 | Stull | 215/211 |
| 3,860,135 | 1/1975 | Yung et al. | 215/306 X |
| 4,146,146 | 3/1979 | Mar | 215/306 X |
| 4,348,207 | 9/1982 | Cappel | 422/102 X |
| 4,420,092 | 12/1983 | Finkelstein | 220/307 X |

FOREIGN PATENT DOCUMENTS

| | | | |
|---|---|---|---|
| 1580404 | 7/1969 | France | 215/306 |
| 540823 | 3/1956 | Italy | 215/306 |

*Primary Examiner*—Barry S. Richman
*Assistant Examiner*—L. Kummert
*Attorney, Agent, or Firm*—Michael J. Hughes

[57] ABSTRACT

A locking microcentrifuge tube (10) is provided which is capable of being sealed in either of two manners, one being a friction-fit seal which is easily opened and the other being a "locked" seal for higher stress applications. The tube body (12) is adapted to mate with the cap (14) at an aperture (24) such that the plug portion (36) of the cap (14) and the aperture (24) form the friction-fit seal at the early stages of insertion. A collar (26) is provided about the aperture (24) on the tube body (12). The collar (26) is formed to include one or more circumferential projections (28, 30). The cap (14) is formed to include depressions (32, 34) adapted to mate with the projections (28, 30) upon full insertion of the plug portion (36) to create the "locked" seal. The cap (14) is secured to the tube body (12) by a hinge (38) and a tab (40). The primary usage of the locking microcentrifuge tube (10) is in biomedical laboratory analysis. The tube (10) may be manufactured in various volumes and shapes to adapt to different microcentrifuges and desired sample sizes.

3 Claims, 1 Drawing Sheet

LOCKING MICROCENTRIFUGE TUBE

TECHNICAL FIELD

The present invention relates generally to containers and more particularly to sealable tubular containers.

BACKGROUND ART

Many laboratories and research facilities today work with biological materials. This field is not only scientifically significant, but also of appreciable economic value.

When separation of biological material is required, the material is spun in a centrifuge. For small quantities of material, the spinning is accomplished in a small tubular container, referred to as a microcentrifuge tube.

Since the fluid with suspended solids is being spun, it is desirable to seal the tube to prevent spillage. Various methods and devices have been tried in the prior art to accomplish the effective sealing of the container.

Some devices make use of a threaded cap, such as that disclosed in U.S. Pat. No. 3,032,225 issued to S. Harding. The Harding device envisions the use of a gasket type element in conjunction with the cap to accomplish the seal.

Another type of device makes use of a separate frictional plug element to seal the open end of the centrifuge tube. Disclosures of this type of device are revealed in two patents issued to Donald Webster, U.S. Pat. Nos. 4,166,573 and 4,222,513.

An improvement as to convenience can be found in devices considering a container with an attached cap. Examples are the devices of Robert Hazard, U.S. Pat. No. 3,877,598, and Yung et al, U.S. Pat. No. 3,860,135. Both of these devices are intended to be used as safety containers, popularly known as "child-proof".

The other microcentrifuge tubes that are currently available on the market accomplish the seal between cap and tube strictly on the basis of friction-fit. The tightness of the fit varies with brand, and is dependent upon the envisioned usage. A tight fit is used if the samples are to be boiled, shipped, or frozen while a looser fitting type is used if the tubes are to be repeatedly opened and closed.

None of these prior art devices completely fulfill the needs of the person seeking an efficient, adaptable microcentrifuge tube. Devices such as those of Harding and Webster, which use multiple components, while effective, are cumbersome to use. Unitary devices like those of Hazard and Yung are more efficient, but are not easily handles.

In sum, the cap/tube seals of the prior art, particularly the friction fit devices, suffer from one or both of two basic disadvantages: (1) If the seal is very secure, it is relatively difficult to open and close the tube, requiring both hands or a special tool. (2) If the seal is looser, it is insufficient when the tube is stressed, as when being boiled, frozen, or shipped.

DISCLOSURE OF INVENTION

Accordingly, it is an object of the present invention to provide a locking microcentrifuge tube which is both efficient and adaptable, while being simple and economical to manufacture.

It is a further object of the present invention to provide a microcentrifuge tube that can provide a sufficiently tight seal so that the material can be handled in a stressful manner.

It is another object of the present invention to provide a tube that can be easily opened and closed with one hand while sealing tightly enough for spinning.

It is yet another object of the present invention to provide a tube with sufficient versatility to satisfy users having widely varied applications.

Briefly, a preferred embodiment of the present invention is a locking microcentrifuge tube that offers two distinct sealing options in a friction-fit seal, and a locking feature. The friction-fit seal is accomplished by a slight flaring of the plug element of the cap. The locking seal is accomplished by further depressing the cap so that projections on the top of the tube mesh with indentations in the cap. The cap and the tube are joined by a flexible hinge so as to form an integral unit. This prevents the cap element from being separated and lost.

An advantage of the present invention is that both types of seals, easy-open and locked-tight, are available in one device, thus improving versatility.

Another advantage of the present invention is that cap and tube are joined by a flexible hinge to form an integral unit, preventing loss.

A further advantage of the present invention is that it can be opened and closed with one hand.

Another advantage of the present invention is that the top of the cap is completely flat and frosted to allow easy labeling of the sample.

These and other objects of the present invention will become clear to those skilled in the art in light of the description of the best presently known method of carrying out the invention and the industrial applicability of the preferred embodiment as illustrated in the drawing.

BEST MODE OF CARRYING OUT INVENTION

Figure 1:
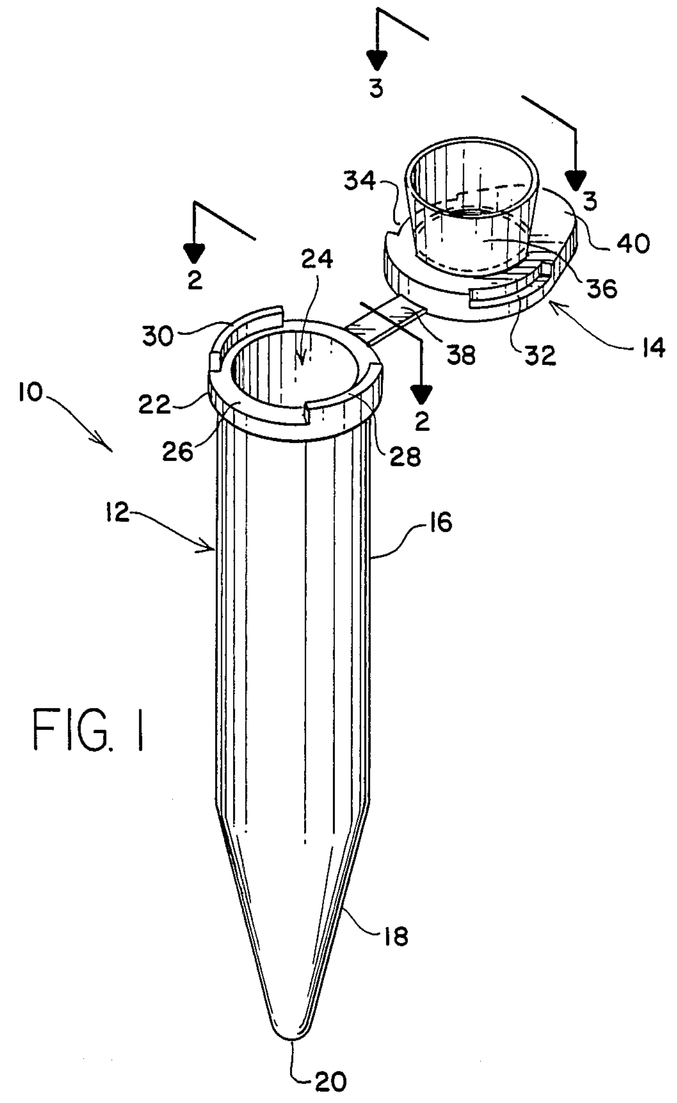
FIG. 1 is a perspective view of the locking microcentrifuge tube.
Figure 2:
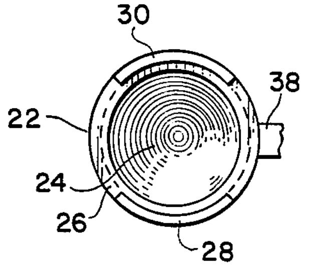
FIG. 2 is a top plan view of the upper portion of the tubular body.

The present invention is a locking microcentrifuge tube that has two modes of sealing. The preferred embodiment of the invention is illustrated in the drawing and described herein.

Referring generally to FIG. 1, the locking microcentrifuge tube assembly is designated by the general reference number 10. The tube assembly 10 consists of a tube body 12 and an integrally attached cap portion 14. These elements form a sealed container into which the biological or similar sample can be placed.

The tube body 12 is for the most part in the shape of a cylinder. The body 12 is hollow, being enclosed by a tube wall 16 having a thickness selected so as to form a relatively large interior cavity. Typically, the tube wall 16 represents only about 10% of the radius of the body 12.

At one end of the tube body 12 is a base wall 18 which seals that end of the tube 10. The base wall 18 is conical in shape, with a bottom tip 20 being formed in the shape of a hemisphere. The tube body 12, the tube wall 16, the base wall 18, and the bottom tip 20 are integrally formed by a method such as injection molding.

At the end opposite the base wall 18, the tube 12 is formed to have an open top end 22. In the vicinity of the top end 22, the tube body 12 is formed to define a circular aperture 24. The aperture 24 is bounded by a collar 26. The collar 26 has the same interior diameter as the tube wall 16 in the cylindrical portion of the body 12, but a significantly greater wall thickness. The collar 26 serves as the seating element for the cap 14 when the tube assembly 10 is closed.

Extending axially from the circumference of the collar 26 is a first projection 28 and a second projection 30. The projections 28 and 30 are selected to mesh with a first depression 32 and a second depression 34 formed on the cap 14 when the tube 10 is locked. A friction-fit seal is accomplished when a flared plug portion 36 on the cap 14 is caused to fit snugly into the aperture 24 and the cap is forced such that the projections 28 and 30 mate with the associated depressions 32 and 34.

Figure 3:
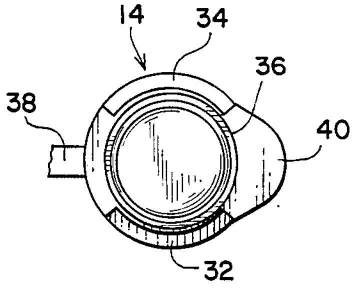
FIG. 3 is a bottom plan view of the cap.

The cap portion 14 is connected to the tube body portion 12 by a flexible hinge 38. The flexible hinge 38 is ordinarily a thin, rectangular piece of flexible material integrally formed therewith. Also formed on the cap portion 14 is a tab 40 to facilitate the opening and closing of the tube assembly 10. The tab 40 (see FIG. 3) is a node on the cap 14 that extends beyond the circumference of the collar 26 when the cap 14 is in the closed position. The tab 40 provides a convenient point to apply pressure to raise the cap 14, allowing one-hand opening of the tube 10. The top of the cap 14 is completely flat and is preferrably frosted to provide an excellent writing surface for easy labelling.

The tube 10 has two optional modes of sealing: a friction-fit mode; or a locking mode. The friction-fit seal is accomplished by inserting the plug portion 36 part way into the aperture 24. The plug portion 36 is in the shape of a frustrum of a hollow cone, the diameter of the end first entering the aperture 24 being the larger. The outer diameter of the plug portion 36 at the large end is also selected to be slightly larger than the aperture 24. This causes a slight deformation of the plug portion 36 upon entry into the aperture 24 resulting in the friction-fit seal being formed. The cap 14 should be depressed only far enough so that the plug portion 36 is introduced into the aperture 24. Complete insertion would cause the locking mechanism to be engaged.

The locking seal mode is accomplished by meshing the projections 28 and 30 with the depressions 32 and 34. The projections 28 and 30 are arc-shaped solids whose midpoints are spaced 180 degrees apart on the circle defined by the collar 26. They are approximately half the height and width of the collar 26. The outer edge of the projections 28 and 30 is coincidental with the outer edge of the collar 26. When the cap 14 is completely closed, the projections 28 and 30 mesh with the depressions 32 and 34 in the cap 14. The length, depth and width of the depressions 32 and 34 are selected to be equal to the length, height and width of the projections 28 and 30. The radial position of the arc midpoints of the depressions 32 and 34 must also coincide with those so that a mating of the elements, projections 28 and 30 and depressions 32 and 34, occurs when the cap 14 is closed completely. This mating accomplishes the more secure locking mode of seal.

It is envisioned that the present invention will be made of a deformable plastic. The flexibility requirements of the plug portion 36 and the flexible hinge 38 make this the obvious choice. The material must be easily cleaned to avoid contamination of successive samples. The presently preferred construction of the tube assembly 10 is molding with medical grade polypropylene.

The approximate dimensions of the elements of the tube assembly 10 are as follows: from the top surface of the cap 14 to the bottom tip 20 of the tube 10, 4.1 cm, the conical section being 1.7 cm in length; the inner diameter at the aperture 24 is 0.9 cm; the outer diameter of the collar 26 and the cap 14 (excluding tab 40) is 1.3 cm; the plug portion 36 is 0.4 cm deep, with outer diameters of 1.0 cm at the end which enters the aperture first, and 0.9 cm at its narrowest portion; and the volume of the tube is 1.5 ml. It is also planned to produce the tube 10 in a 0.6 ml volume version, the dimensions being reduced in accordance with scale.

Those skilled in the art will readily observe that numerous modifications and alterations of the device may be made while retaining the teachings of the present invention. Accordingly, the above disclosure is not intended as limiting. The appended claims are therefore to be interpreted as encompassing the entire spirit and scope of the invention.

INDUSTRIAL APPLICABILITY

The microcentrifuge tube of the present invention is intended for laboratory use. Microcentrifuge tubes are spun in centrifuges to separate small amounts of biological or other material.

Until now, the seal obtainable between the caps and tubes available has been predominantly of friction-fit variety. Some brands of tubes offer a less tight seal, which is an advantage when the tubes are opened and closed many times. However, this may become a disadvantage when the tubes need to be boiled, shipped, or frozen for storage with material in them, because the caps can pop open and the material can leak or evaporate. Other brands offer a tight seal, which is an advantage when boiling, shipping, or freezing. However, this type presents a logistical and handling problem when the tubes need to be repeatedly opened and closed.

The microcentrifuge tube of the present invention is the first tube of its type which offers two distinct sealing options. It combines a friction-fit cap with a locking feature. The first step (the friction-fit mode) allows easy one-hand opening, but seals tightly enough for spinning. The tighter, locked mode (occuring when the cap is pressed down completely into the tube to engage the locking feature) provides the optimum seal for boiling, shipping, storing, or freezing. The overall tube assembly thus provides adaptability to many users who have a need for tubes with both types of seal.

Because of its adaptability and usefulness in laboratory work, the present invention should find widespread applicability. Those skilled in the art will readily envisage alternate and additional applications of the invention.

We claim:

1. A locking microcentrifuge tube assembly comprising:

A. a hollow tubular body, tapered to a close at one end and including means defining an aperture comprising a thickened collar at the opposite end, the collar being provided with multiple axially exterior peripheral projections extending from the collar away from the body, each said projection encompassing between thirty and one hundred fifty degrees of arc;

B. a cap portion, including a lower plug portion which is flared outwardly from its attachment point to the top of the cap so that the extreme end of the plug portion has an outer diameter slightly larger than the inner diameter of the tubular body;

the plug portion being formed from a resilient material capable of non-destructive deformation so that a friction fit seal is formed when the plug portion is forcibly introduced into the tubular body;

the cap portion further including multiple depressions formed therein, each said depression being adapted to mate with a respective one of said projections of the collar to form a tight mesh therewith, the mesh occurring with a greater degree of interconnection than is present in the friction fit seal between the plug portion of the cap and the tubular body;

thereby providing a locking microcentrifuge tube with two modes of sealing, the specific mode being a function only of how firmly the plug portion is introduced into the tubular body, with either mode achievable through one-hand manipulation of the tube; and C. a flexible hinge connecting the cap portion and the tubular body portion such that the cap portion may be readily disengaged from the tubular body portion yet not totally detached from the assembly.

2. The assembly of claim 1 wherein:

the collar is provided with two of said axially exterior peripheral projections, said projections being opposingly arrayed and each said projection encompassing 90′ of arc.

3. The assembly of claim 1 wherein:

the interior facing surfaces of said axially exterior peripheral projections are separated from said aperture by a portion of the width of the collar.

* * * * *